(12) United States Patent
Hsu et al.

(10) Patent No.: US 10,437,291 B2
(45) Date of Patent: Oct. 8, 2019

(54) ENGAGING MECHANISM, TRANSMISSION DOCK EQUIPPED WITH THE SAME, AND ELECTRONIC APPARATUS HAVING THE SAME

(71) Applicant: GETAC TECHNOLOGY CORPORATION, Hsinchu County (TW)

(72) Inventors: Wan-Lin Hsu, Taipei (TW); Juei-Chi Chang, Taipei (TW)

(73) Assignee: GETAC TECHNOLOGY CORPORATION, Hsinchu (TW)

( * ) Notice: Subject to any disclaimer, the term of this patent is extended or adjusted under 35 U.S.C. 154(b) by 90 days.

(21) Appl. No.: 15/782,742

(22) Filed: Oct. 12, 2017

(65) Prior Publication Data
US 2019/0113954 A1   Apr. 18, 2019

(51) Int. Cl.
*G06F 1/16* (2006.01)

(52) U.S. Cl.
CPC .......... *G06F 1/1679* (2013.01); *G06F 1/1626* (2013.01); *G06F 1/1632* (2013.01); *G06F 1/1654* (2013.01); *G06F 1/1669* (2013.01)

(58) Field of Classification Search
CPC .... G06F 1/1632; G06F 1/1601; G06F 1/1679; G06F 1/1626; G06F 1/1669; G06F 1/1654
See application file for complete search history.

(56) References Cited

U.S. PATENT DOCUMENTS 8,817,456 B2 * 8/2014 Lin ...................... G06F 1/1669
                                                                361/679.29

* cited by examiner

*Primary Examiner* — Dimary S Lopez Cruz
*Assistant Examiner* — Ingrid D Wright (57) ABSTRACT

An engaging mechanism, a transmission dock equipped with the same, and an electronic apparatus having the same are provided. The engaging mechanism includes a rotary fastening element, a guiding frame and a translating frame. The rotary fastening element rotates about an axis to reach an engaging state. The guiding frame has two opposing outer sidewalls and is protrudingly disposed on a support surface of the transmission dock. The axis is substantially parallel to the support surface. The rotary fastening element protrudes from one of the outer sidewalls in the engaging state. The translating frame has two opposing inner sidewalls and two opposing upper wall surfaces. The two outer sidewalls are disposed between the two inner sidewalls, allowing the rotary fastening element to rotate and reach the engaging state and thereby stop one of the upper wall surfaces, when the translating frame connects with the support surface.

13 Claims, 12 Drawing Sheets

ENGAGING MECHANISM, TRANSMISSION DOCK EQUIPPED WITH THE SAME, AND ELECTRONIC APPARATUS HAVING THE SAME

BACKGROUND OF THE INVENTION

Field of the Invention

The present invention relates to an engaging mechanism, a transmission dock equipped with the same, and an electronic apparatus having the same and, more particularly, to an engaging mechanism having a rotary fastening element, a transmission dock equipped with the same, and an electronic apparatus having the same.

Description of the Prior Art

Due to technological advancement, notebook computers are increasingly light, thin and compact, whereas tablets are increasingly robust. Despite their sophistication, notebook computers and tablets nowadays still have room for improvement. For instance, tablets nowadays are readily portable but inefficient for a lack of a built-in keyboard, and the opposite is true of notebook computers nowadays.

In view of this, recently manufacturers launched a two-piece notebook computer—an innovative variant to notebook computers. The two-piece notebook computer comprises a monitor and a keyboard. The monitor and the keyboard are fastened to, and unfastened from, each other as needed. When fastened together, the monitor and the keyboard enable the two-piece notebook computer to perform office works and programming. When unfastened from the keyboard, the monitor functions as a conventional tablet. Considering its two advantages, namely highly portable and highly efficient, the two-piece notebook computer is going to become a favorite of consumers. Therefore, it is important to assemble and disassemble the two-piece notebook computer quickly as well as reinforce the connection of its monitor and keyboard with a view to meeting the requirements of its use.

SUMMARY OF THE INVENTION

In view of the aforesaid drawbacks of the prior art, it is an objective of the present invention to provide an engaging mechanism, a transmission dock equipped with the same, and an electronic apparatus having the same, so as to quickly put together and disconnect a monitor and a keyboard of a two-piece notebook computer as needed and reinforce connection of the monitor and the keyboard.

According to the present invention, the engaging mechanism comprises a rotary fastening element, a guiding frame and a translating frame. The rotary fastening element rotates about an axis to reach an engaging state. The guiding frame has two opposing outer sidewalls and is protrudingly disposed on a support surface of a transmission dock. The axis is substantially parallel to the support surface. The rotary fastening element protrudes from one of the outer sidewalls in the engaging state. The translating frame has two opposing inner sidewalls and two opposing upper wall surfaces. The two outer sidewalls are disposed between the two inner sidewalls, allowing at least one rotary fastening element to rotate and reach the engaging state and thereby stop one of the upper wall surfaces, when the translating frame connects with the support surface.

According to the present invention, the transmission dock is adapted to connect with a first electronic device, allowing a connecting lateral side of the first electronic device to align with a support direction and connect with the transmission dock through at least one translating frame. The transmission dock comprises a base, at least one rotary fastening element and at least one guiding frame. The base has a receiving slot for receiving the connecting lateral side. The at least one rotary fastening element rotates about an axis to reach an engaging state. The at least one guiding frame has two opposing outer sidewalls and is protrudingly disposed on a support surface of a bottom of the receiving slot. The axis is substantially parallel to the support surface. The at least one translating frame has two opposing inner sidewalls and two upper wall surfaces adjoining the two inner sidewalls, respectively. When the translating frame connects with the support surface, the two outer sidewalls are disposed between the two inner sidewalls, allowing the at least one rotary fastening element to rotate and reach the engaging state and thereby stop one of the upper wall surfaces.

According to the present invention, the electronic apparatus comprises a transmission dock, a first electronic device and a second electronic device. The first electronic device has a connecting lateral side and at least one translating frame. The at least one translating frame is disposed on the connecting lateral side. The first electronic device is aligned with a support direction and electrically connected to the transmission dock. The transmission dock is disposed at the second electronic device. The transmission dock comprises a base, at least one rotary fastening element and at least one guiding frame. The base has a receiving slot for receiving the connecting lateral side. The at least one rotary fastening element rotates about an axis to reach an engaging state. The at least one guiding frame has two opposing outer sidewalls. The at least one guiding frame is protrudingly disposed on a support surface of the bottom of the receiving slot. The axis is substantially parallel to the support surface. The at least one translating frame has two opposing inner sidewalls and two upper wall surfaces adjoining the two inner sidewalls, respectively. The two outer sidewalls are disposed between the two inner sidewalls, and the at least one rotary fastening element rotates and reaches the engaging state to thereby stop one of the upper wall surfaces, when the translating frame connects with the support surface.

Regarding an engaging mechanism, a transmission dock equipped with the same, and an electronic apparatus having the same, provided according to the present invention, the user finishes performing the assembly process by moving the first electronic device (i.e., a monitor) in the support direction substantially perpendicular to the support surface so as for the first electronic device to connect with the transmission dock, because the rotary fastening elements rotate about the axis substantially parallel to the support surface of the transmission dock, not to mention that in the aforesaid course the translating frames smoothly push and slide past the rotary fastening elements so as to effectuate engagement. Hence, the engaging mechanism of the present invention is operated intuitively and conveniently and thus enables the user to mount the first electronic device (i.e., a monitor) on the second electronic device (i.e., a keyboard) quickly.

The rotary fastening elements are stopped on the upper wall surfaces of the translating frames as soon as the rotary fastening elements rotate and reach the engaging state; hence, the translating frames are restricted by the rotary fastening elements and thus stay on the support surface. Therefore, the first electronic device stays on the support surface to reinforce the connection of the first electronic device and the second electronic device.

The description of the disclosure of the present invention and the description of the implementation of the present invention are intended to illustrate and explain the spirit and principles of the present invention and provide further interpretation of the claims of the present invention.

BRIEF DESCRIPTION OF THE DRAWINGS

FIG. 8 is a schematic view of a protruded position which a security knob shown in FIG. 5B switches to;

FIG. 9 is a schematic view of an unfastening position which an unfastening element shown in FIG. 5B switches to; and FIG. 10 is a schematic view of the unfastening position which the unfastening element shown in FIG. 5B switches to.

DETAILED DESCRIPTION OF THE EMBODIMENTS

Fine features and advantages of the present invention are described below to enable persons skilled in the art to gain insight into the technical solution disclosed in the present invention and thus implement the present invention. Furthermore, persons skilled in the art can easily understand related objectives and advantages of the present invention by referring to the disclosure contained herein, the claims, and the accompanying drawings. The embodiments below further explain technical features of the present invention but are not restrictive of the scope of the present invention.

Embodiments of the present invention are illustrated by the accompanying drawings. Practical details of the embodiments of the present invention are described below. However, it is to be understood that the present invention is not limited in its application to the practical details. For the sake of brevity, the accompanying drawings show conventional, common structures and components in a schematic manner. To render the accompanying drawings neat, wirings, such as cables and flexible flat cables, are omitted therefrom.

Unless otherwise defined, terms, including technical ones and scientific ones, used herein have general meanings comprehensible to persons skilled in the art. Specifically speaking, the aforesaid terms used herein must be interpreted in the same way as they are interpreted when applied to a technical field related to the present invention. The aforesaid terms must not be interpreted in a manner to be overly ideal or formal, unless they have definite definitions.

Figure 1:
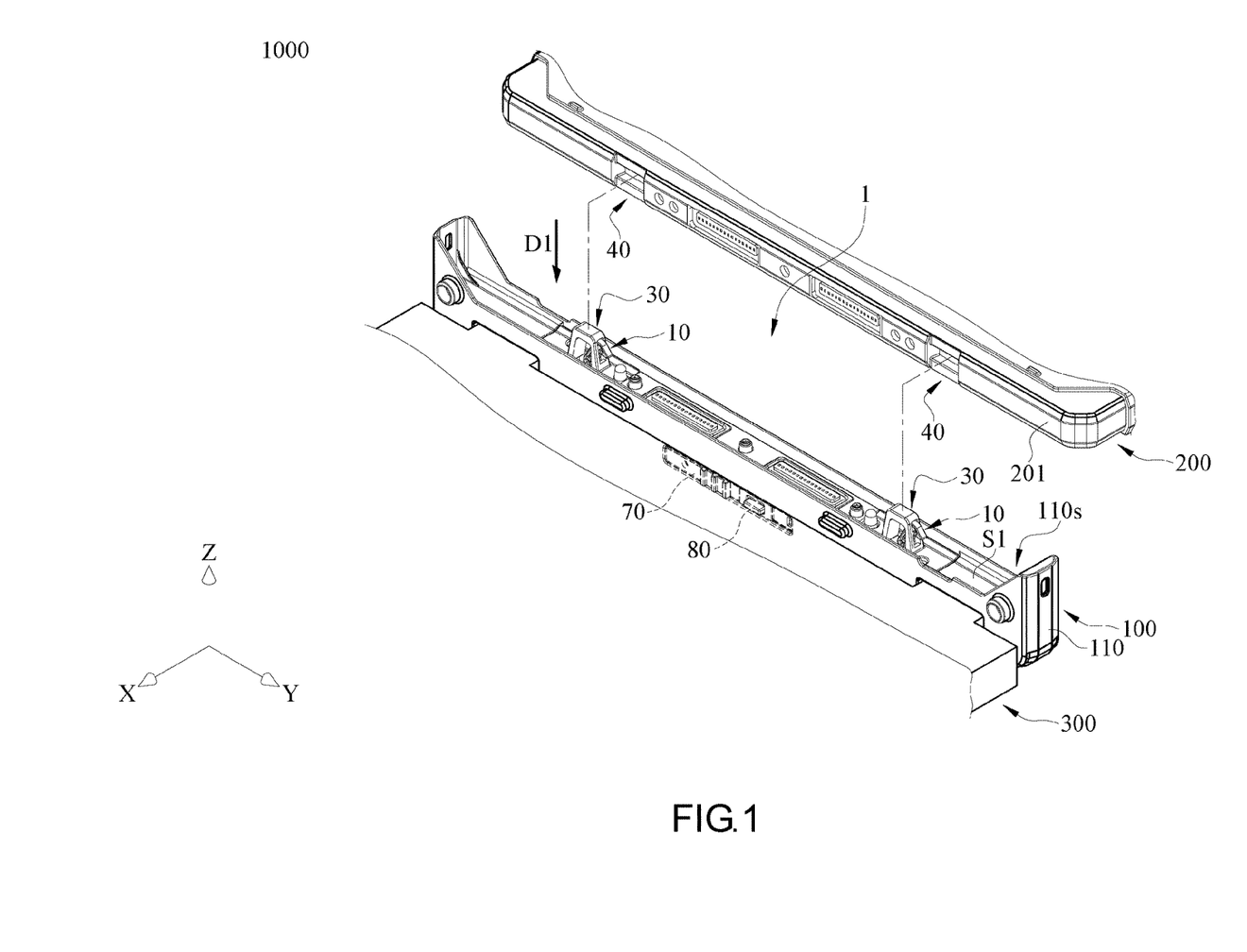
FIG. 1 is a partial exploded perspective view of an electronic apparatus according to an embodiment of the present invention.

Referring to FIG. 1, there is shown a partial exploded perspective view of an electronic apparatus according to an embodiment of the present invention. In this embodiment, an electronic apparatus 1000 comprises a transmission dock 100, a first electronic device 200 and a second electronic device 300. However, it is to be understood that the present invention is focused on connection of the first electronic device 200 and the transmission dock 100 as well as how they are mounted; hence, FIG. 1 shows only part of the first electronic device 200 and the second electronic device 300.

The first electronic device 200 is a panel computer and has a display portion (not shown). The display portion is, for example, a liquid crystal display panel for displaying a frame and executing various touch operations. The first electronic device 200 functions independently as a tablet and has therein electronic components, such as a central processing unit (CPU), a hard disk drive (HDD), a random access memory (RAM), and a battery, which operate in conjunction with each other to perform various functions, but the present invention is not limited thereto.

The second electronic device 300 has a plurality of input components (not shown, whereby a user enters data into the second electronic device 300), including a keyboard, a touch panel and a plurality of keys. Optionally, the first electronic device 200 and the second electronic device 300 come with ports, such as a headphone jack and a USB jack, to meet various fundamental needs, but the present invention is not limited thereto.

In this embodiment, the second electronic device 300 is pivotally connected to one side of the transmission dock 100, whereas a connecting lateral side 201 of the first electronic device 200 is adapted to be inserted in a support direction D1 and received in a receiving slot 110s of the transmission dock 100 so as to be connected to a support surface S1 of the transmission dock 100. The support direction D1 is substantially perpendicular to the support surface S1. The support surface S1 of the transmission dock 100 is an upper surface attributed to the transmission dock 100 and dedicated to supporting one side of the first electronic device 200. When the connecting lateral side 201 of the first electronic device 200 connects with the support surface S1 of the transmission dock 100, a connector (not shown) disposed on the connecting lateral side 201 of the first electronic device 200 is electrically connected to a connector (not shown) disposed on the support surface S1 of the transmission dock 100 to enable exchange of signals and electrical power between the first electronic device 200 and the second electronic device 300. For instance, signals are sent to the first electronic device 200 from the second electronic device 300 through a keyboard, a touch panel or keys disposed on the second electronic device 300 so that the first electronic device 200 receives the signals and acts in response to the signals. Hence, the first electronic device 200 and the second electronic device 300 can be demounted and mounted, allowing the electronic apparatus 1000 to form a demountable, mountable two-piece computer.

Figure 2:
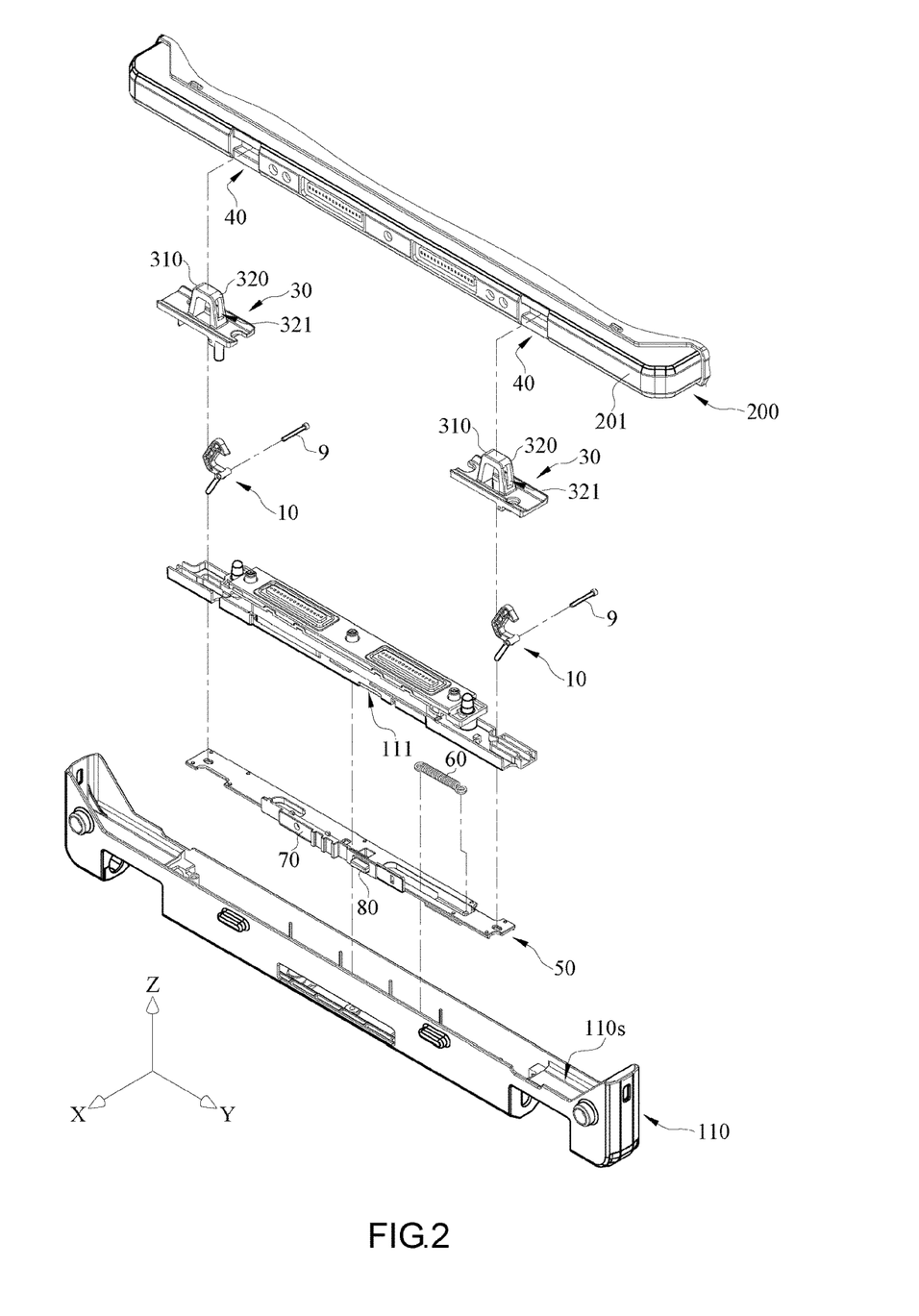
FIG. 2 is a partial exploded perspective view of the electronic apparatus shown in FIG. 1.
Figure 3:
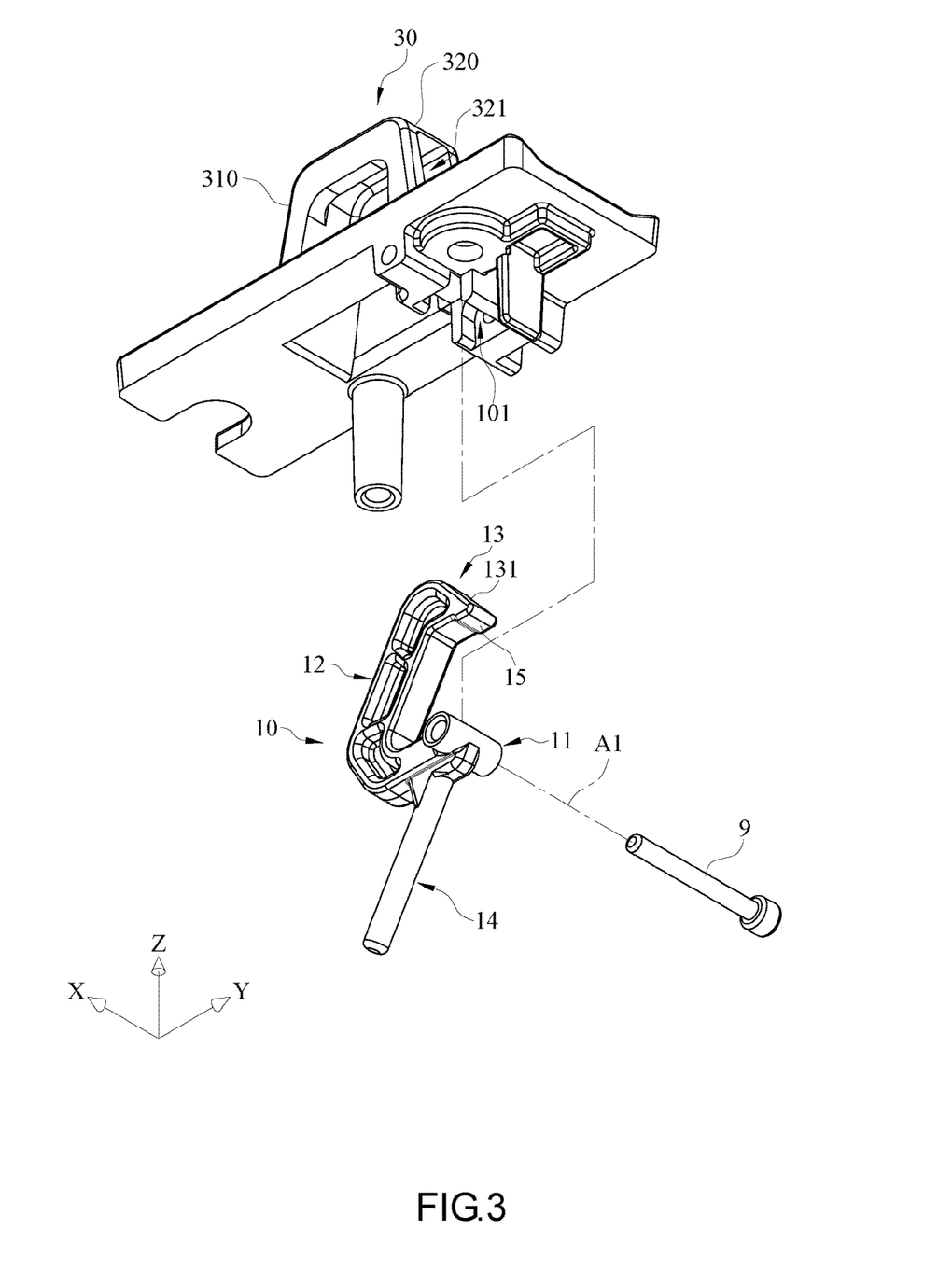
FIG. 3 is a partial exploded enlarged view of a rotary fastening element and a transmission dock shown in FIG. 1.
Figure 4A:
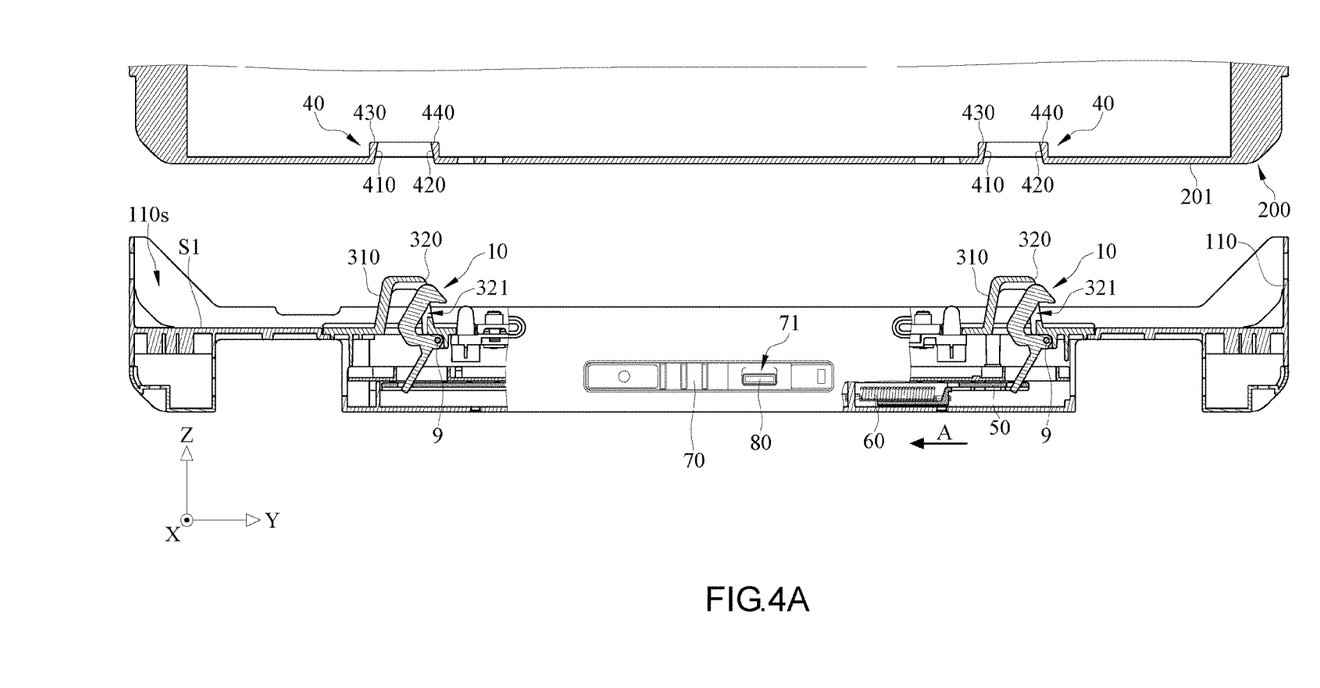
FIG. 4A is a partial exploded, laterally cross-sectional, enlarged view of the electronic apparatus shown in FIG. 1.
Figure 4B:
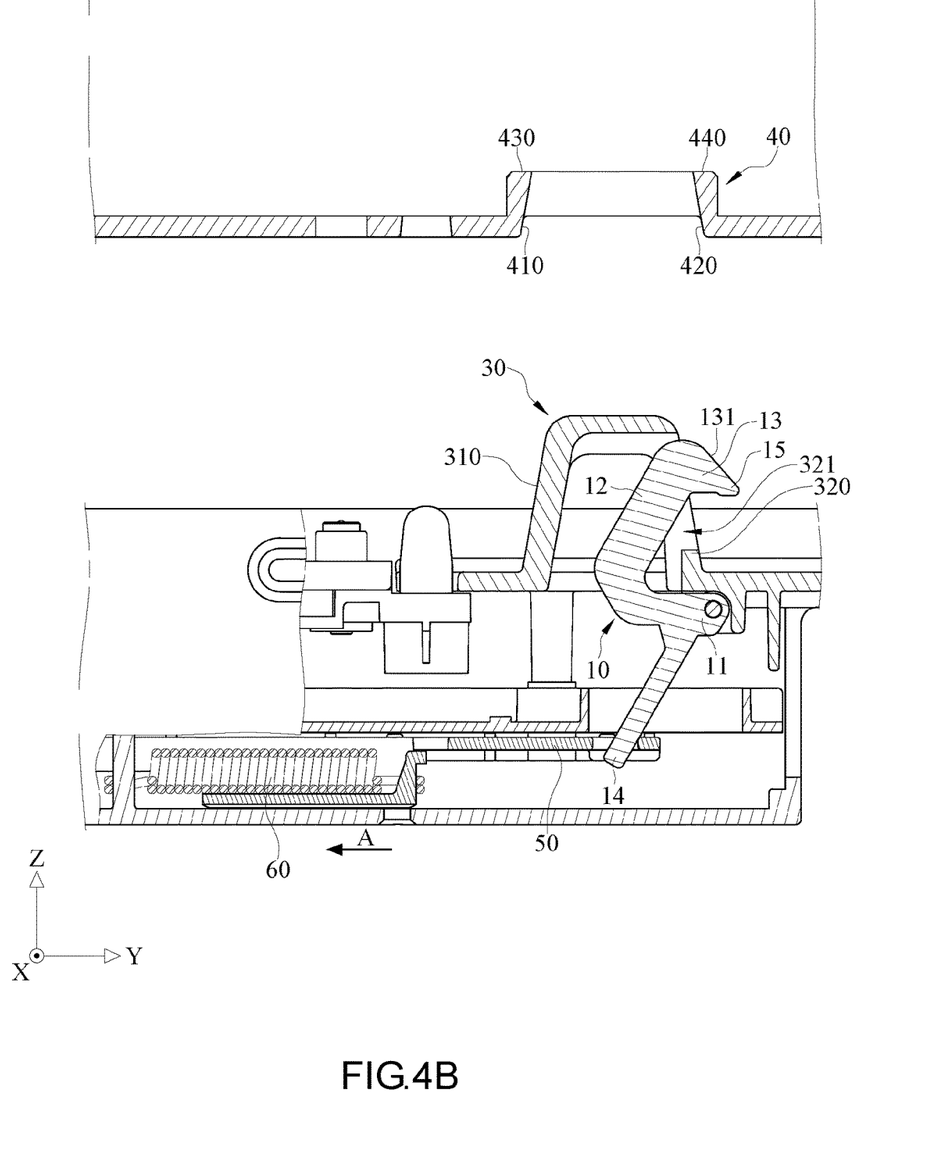
FIG. 4B is a partial enlarged view of FIG. 4A.

The present invention is further illustrated by FIGS. 2-4B. FIG. 2 is a partial exploded perspective view of the electronic apparatus shown in FIG. 1. FIG. 3 is a partial exploded enlarged view of a rotary fastening element and a transmission dock shown in FIG. 1. FIG. 4A is a partial exploded, laterally cross-sectional, enlarged view of the electronic apparatus shown in FIG. 1. FIG. 4B is a partial enlarged view of the electronic apparatus shown in FIG. 4A. To show related components conveniently, FIG. 2 shows part of the first electronic device 200 but omits the second electronic device 300, whereas FIG. 4A omits the second electronic device 300.

In this embodiment, the transmission dock 100 comprises a base 110, two rotary fastening elements 10 and two guiding frames 30. The base 110 has the support surface S1 which connects with the first electronic device 200 and the receiving slot 110s which receives the connecting lateral side 201 of the first electronic device 200.

In this embodiment, the guiding frames 30, part of the support surface S1, and a pivotal member 101 disposed on each guiding frame 30 (in such a manner that the pivotal member 101 faces away from the support surface S1) are simultaneously formed with an aluminum-magnesium alloy mold. Therefore, the guiding frames 30, part of the support surface S1, and the pivotal member 101 are integrally formed with a single alloy mold. However, in another embodiment, the pivotal member 101 is integrally formed with the base 110. The guiding frames 30 are protrudingly disposed on the support surface S1. The guiding frames 30 are each a substantially inverted U-shaped hollow-cored structure. The guiding frames 30 each have two opposing outer sidewalls 310 and 320. The outer sidewalls 320 of the guiding frames 30 each have an opening 321.

The rotary fastening elements 10 each comprise a pivotal portion 11, an arm 12, a hook portion 13 and a rod 14. The pivotal portion 11 is pivotally connected to the base 110 of the transmission dock 100 about an axis A1 and positioned proximate to a corresponding one of the outer sidewalls 320 of the guiding frames 30. Referring to FIG. 3, the pivotal portion 11 is placed in the pivotal member 101 beneath the alloy mold for forming the guiding frames 30, and then a shaft 9 is passed through the pivotal member 101 and the pivotal portion 11, thereby allowing the rotary fastening element 10 to be pivotally connected to the alloy mold for forming the guiding frames 30. The axis A1 (equivalent to the direction in which the shaft 9 extends) is substantially parallel to the support surface S1 of the transmission dock 100 (from, for example, the angle taken in FIG. 4A.) The arm 12 and the hook portion 13 extend from the pivotal portion 11 successively, whereas the rod 14 extends from the pivotal portion 11 in a direction away from the arm 12. The rotary fastening elements 10 each further comprise a bump 15 formed at the tip of the hook portion 13. The hook portion 13 has a pushed area 131. The rotary fastening element 10 rotates about the axis A1 until it reaches an engaging state (shown in FIG. 4B). When the rotary fastening element 10 is in the engaging state, the hook portion 13 of the rotary fastening element 10 protrudes out of the opening 321 of the outer sidewall 320 of the guiding frames 30, thereby allowing the pushed area 131 to be exposed from the guiding frames 30.

The first electronic device 200 has two translating frames 40 concavely disposed on the connecting lateral side 201 of the first electronic device 200 and corresponding in position to the guiding frames 30, respectively. The translating frames 40 each have two opposing inner sidewalls 410, 420 and two upper wall surfaces 430, 440 which adjoin the two inner sidewalls 410, 420, respectively.

In this embodiment, the electronic apparatus 1000 comprises an engaging mechanism 1. The engaging mechanism 1 prevents the first electronic device 200 from separating from the transmission dock 100 and thus disconnecting from the second electronic device 300, when the connecting lateral side 201 of the first electronic device 200 connects with the support surface S1 of the transmission dock 100.

The engaging mechanism 1, for example, comprises the two rotary fastening elements 10, the two guiding frames 30, the two translating frames 40, a linking element 50, an elastic element 60, an unfastening element 70 and a security knob 80.

The linking element 50 is slidably disposed at the base 110 of the transmission dock 100. The two rods 14 of the rotary fastening elements 10 penetrate the linking element 50 simultaneously; hence, the linking element 50 is adapted to drive the two rods 14 simultaneously. The elastic element 60 is a tension spring, with one end fixed to the base 110 of the transmission dock 100, and the other end fixed to the linking element 50. Normally, the elastic element 60 exerts on the linking element 50 a drag in the direction indicated by arrow A; hence, the linking element 50 enables the elastic element 60 to drive the two rotary fastening elements 10 into the engaging state, thereby allowing the pushed area 131 to be exposed from the guiding frames 30. The unfastening element 70 is fixed to one side of the linking element 50. A user operates the unfastening element 70 in order to drive the linking element 50 to slide relative to the transmission dock 100. In this embodiment, the unfastening element 70 slidably moves between an unfastening position and a fastening position. It is to be understood that the elastic element 60 normally pulls the unfastening element 70 toward the fastening position through the linking element 50 in the absence of the user's operation of the unfastening element 70. The security knob 80 is disposed inward to the unfastening element 70 and aligned in a direction perpendicular to the direction in which the unfastening element 70 slidably moves. The security knob 80 protrudes out of a slide hole 71 of the unfastening element 70 and is adapted to allow the user to use his or her finger to move and switch the security knob 80 between a protruded position and a hidden position.

Figure 5A:
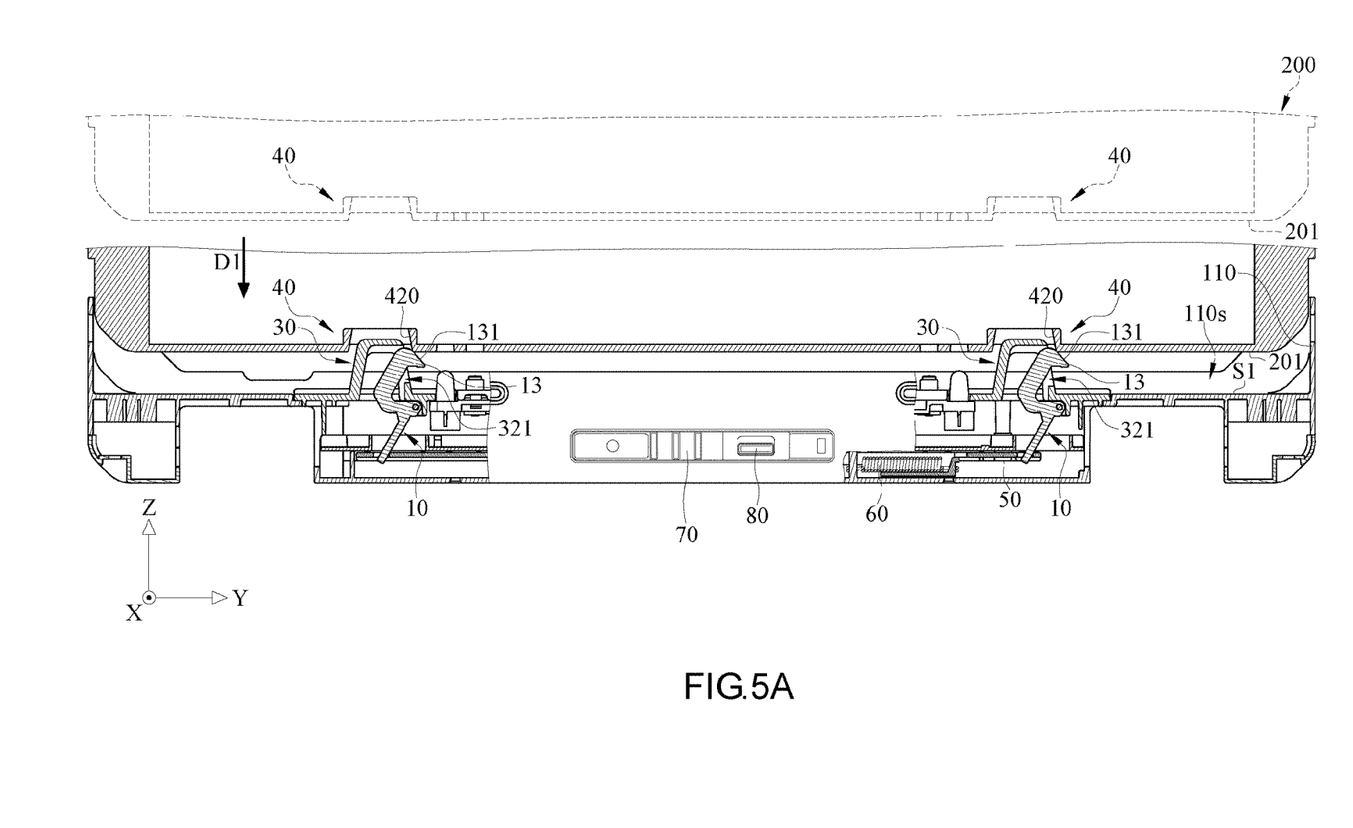
FIGS. 5A-5B are schematic views of operation of the electronic apparatus shown in FIG. 1.
Figure 5B:
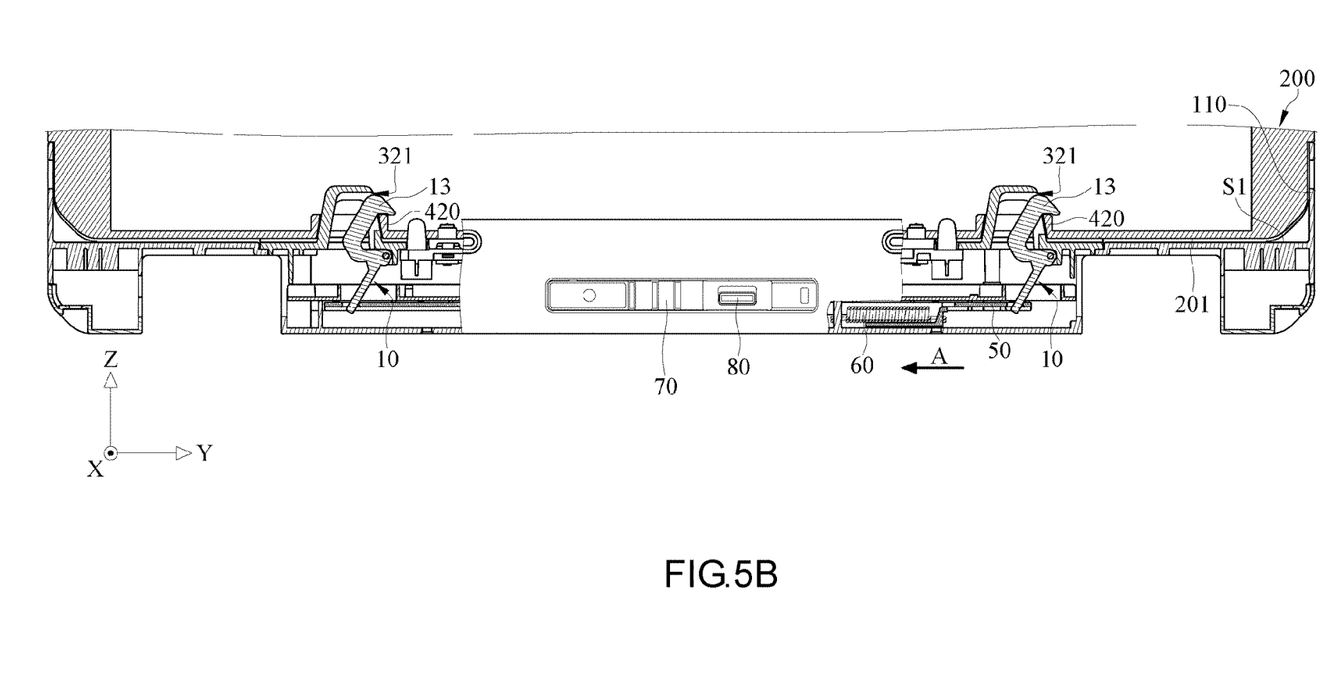
Figure 6:
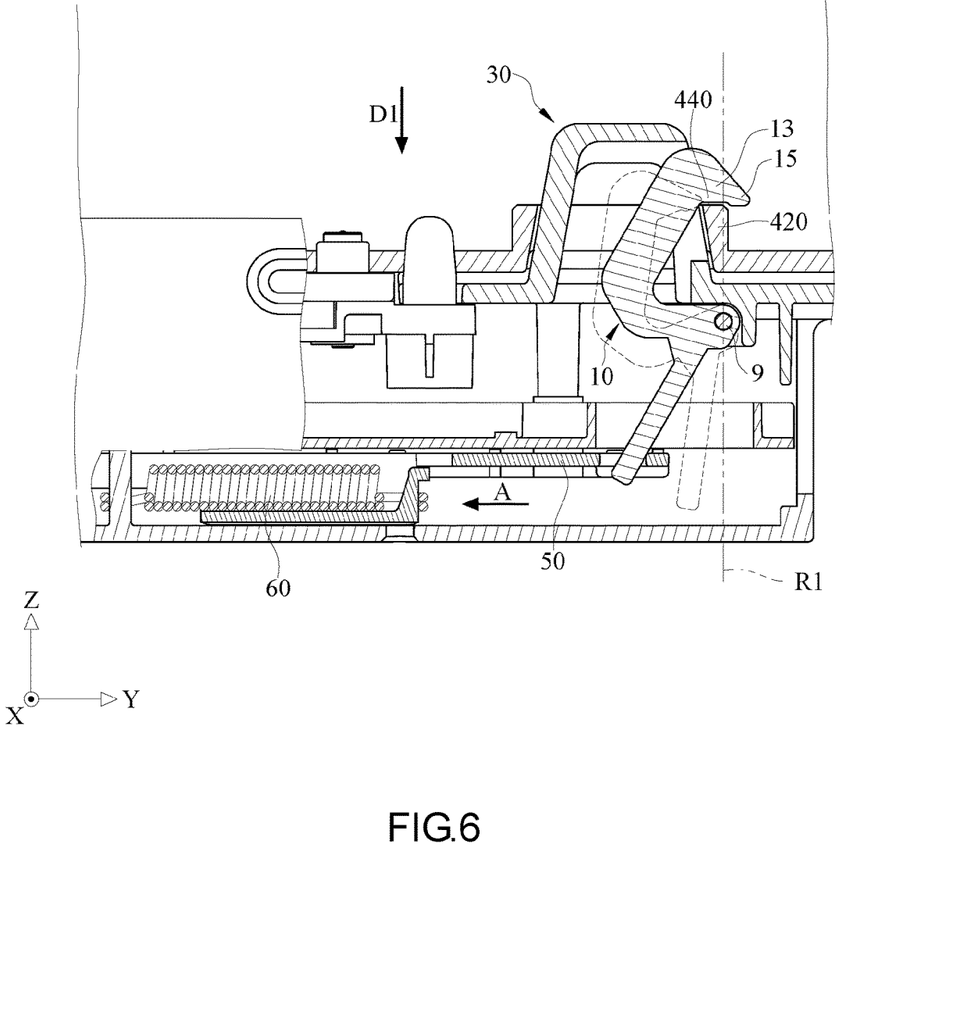
FIG. 6 is a partial enlarged view of FIG. 5B.

Referring to FIGS. 5A-6, there are shown in FIGS. 5A-5B schematic views of operation of the electronic apparatus of FIG. 1 and shown in FIG. 6 a partial enlarged view of FIG. 5B. FIGS. 5A-6 illustrate how to mount the first electronic device 200 and the second electronic device 300 and thereby clearly depict positions of components of the engaging mechanism 1 relative to each other and operation of the components.

Referring to FIG. 5A, to mount the first electronic device 200 on the second electronic device 300, the user inserts the first electronic device 200 in the support direction D1 into the receiving slot 110s of the transmission dock 100 to allow the first electronic device 200 to connect with the support surface S1 of the transmission dock 100.

During the aforesaid process, the translating frames 40 move together with the first electronic device 200 in the support direction D1 to fit to the guiding frames 30 on the support surface S1. The joint use of the guiding frames 30 and the translating frames 40 enables the user to move the first electronic device 200 in the correct direction required for mounting the first electronic device 200. The inner sidewall 420 of the translating frames 40 pushes the pushed area 131 on the hook portion 13 protruding from the outer sidewall 320 of the guiding frames 30, because the hook portion 13 is located on a path of movement of the inner sidewall 420 of the translating frames 40.

It is to be understood that in the course shown in FIG. 5A through FIG. 5B the translating frames 40 keep moving in the support direction D1 to force the hook portion 13 to move into the guiding frames 30 and thus allow the rotary fastening element 10 to turn counterclockwise (from the angle taken in FIG. 5A), thereby allowing the inner sidewall 420 to slide past the hook portion 13. When the connecting lateral side 201 connects with the support surface S1, the translating frames 40 no longer press against the hook portion 13 of the rotary fastening element 10, and in consequence the elastic element 60 pulls the rod 14 of the rotary fastening element 10 in the direction indicated by arrow A through the linking element 50, thereby allowing the rotary fastening element 10 to turn clockwise (from the angle taken in FIG. 5B) and reach the engaging state.

FIG. 6 shows that one of the rotary fastening elements 10 (FIG. 5B) is in the engaging state. The hook portion 13 of the rotary fastening element 10 is engaged with the translating frames 40 and stopped above the upper wall surface 440 of the translating frames 40. When the rotary fastening element 10 is in the engaging state, a reference line R1 parallel to the support direction D1 crosses the hook portion 13, the upper wall surface 440, and the shaft 9 passed through the pivotal portion 11. Although the translating frames 40 tend to move upward (i.e., away from the support direction D1), the force exerted by the upper wall surface 440 on the hook portion 13 of the rotary fastening element 10 does not produce any torque otherwise to be applied to the rotary fastening element 10, because the extension line of the force exerted by the upper wall surface 440 on the hook portion 13 of the rotary fastening element 10 crosses the shaft 9 passed through the pivotal portion 11. Therefore, if the first electronic device 200 tends to move away from the transmission dock 100 in response to a vibration or impact, the rotary fastening element 10 will neither move nor rotate, thereby keeping the first electronic device 200 at a position conducive to its connection with the support surface S1. Due to a reduction of the chance that the rotary fastening element 10 quits the engaging state because of a vibration or impact which occurs to the first electronic device 200, the scenario in which the first electronic device 200 moves away from the transmission dock 100 and separates from the transmission dock 100 is precluded. Furthermore, the bump 15 of the rotary fastening element 10 is fastened to the outer side of the translating frames 40 to not only change the direction in which the translating frames 40 exert a force on the hook portion 13 (so as to produce, for example, a torque whereby the rotary fastening element 10 rotates to reach the engaging state), but also increase the friction between the hook portion 13 and the translating frames 40, thereby lowering the chance that the rotary fastening element 10 will quit the engaging state.

Figure 7:
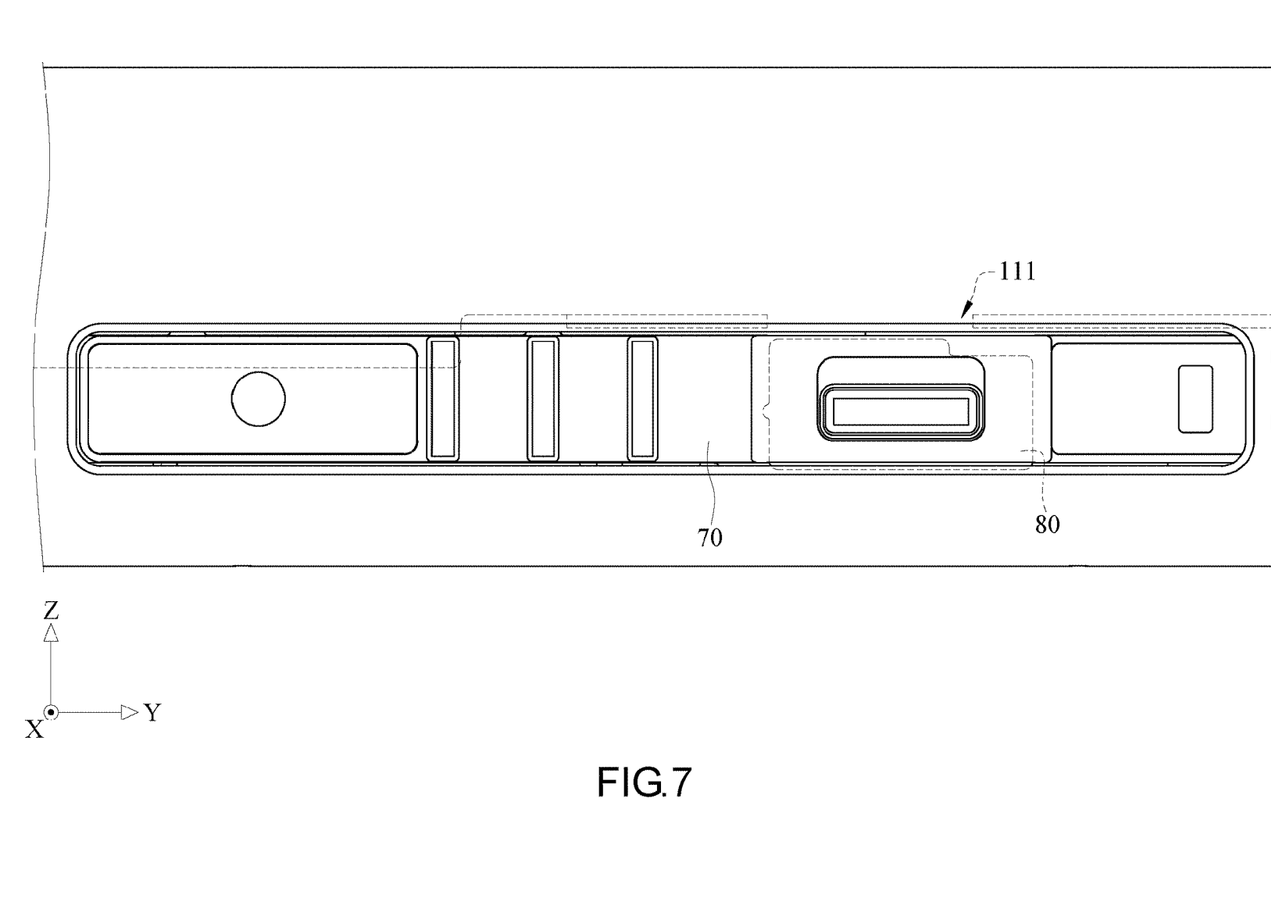
FIG. 7 is a partial enlarged view of an unfastening element and a security knob shown in FIG. 5B.
Figure 8:
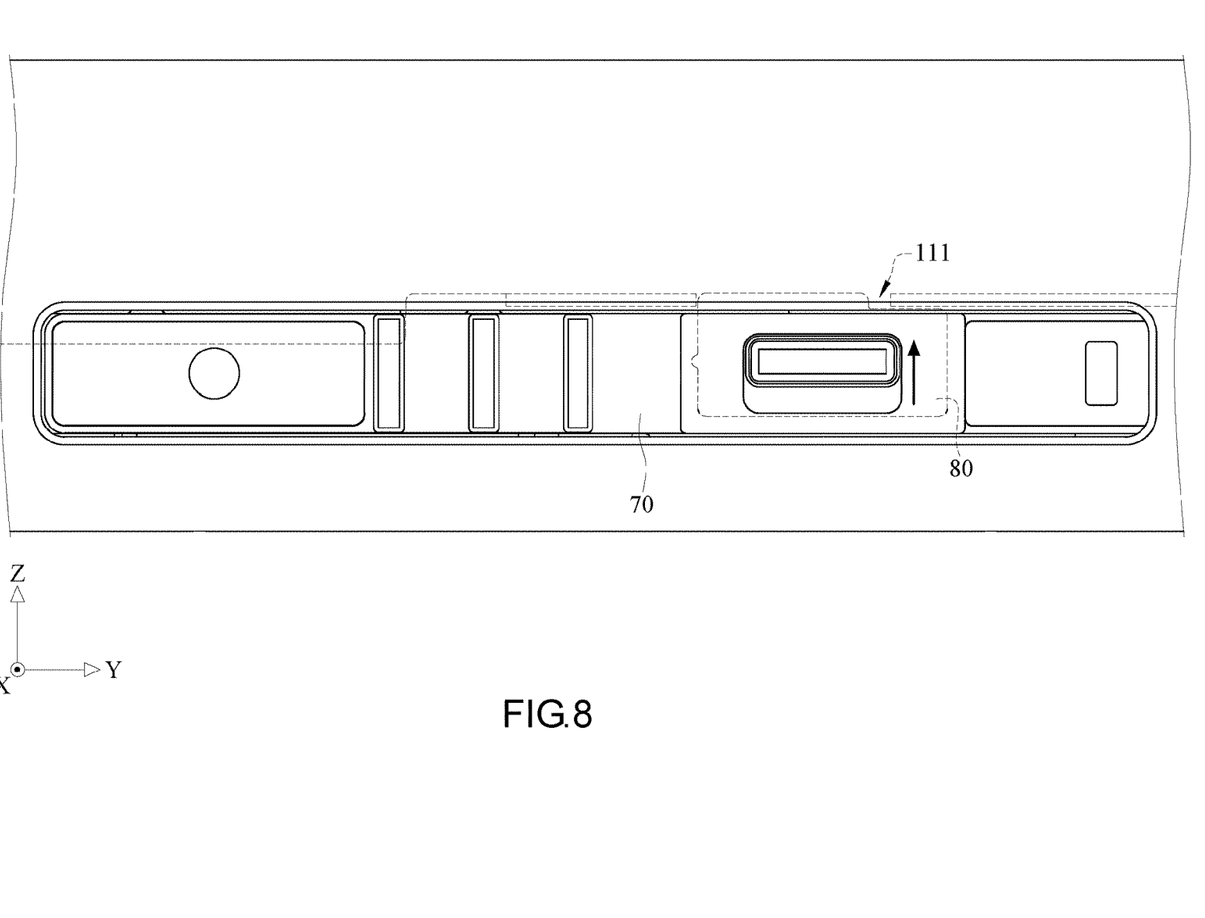

Referring to FIGS. 7-8, there are shown in FIG. 7 a partial enlarged view of an unfastening element and a security knob of FIG. 5B, and shown in FIG. 8 a schematic view of a protruded position which a security knob shown in FIG. 5B switches to. The unfastening element 70 returns to the fastening position (shown in FIG. 7) as the linking element 50 slides, while the elastic element 60 is bringing the rotary fastening element 10 back to the engaging state through the linking element 50. At this point in time, to let the unfastening element 70 stays at the fastening position, the security knob 80 is slid upward and switched to the protruded position. Referring to FIG. 8, the security knob 80 protrudes from the upper edge of the unfastening element 70 and enters a limiting recess 111 of the transmission dock 100. The limiting recess 111 prevents the security knob 80 from sliding together with the unfastening element 70 and thereby confines the unfastening element 70 to the fastening position so that the user cannot move the security knob 80, so as to prevent the unfastening element 70 from being inadvertently touched to cause the rotary fastening element 10 to quit the engaging state.

Figure 9:
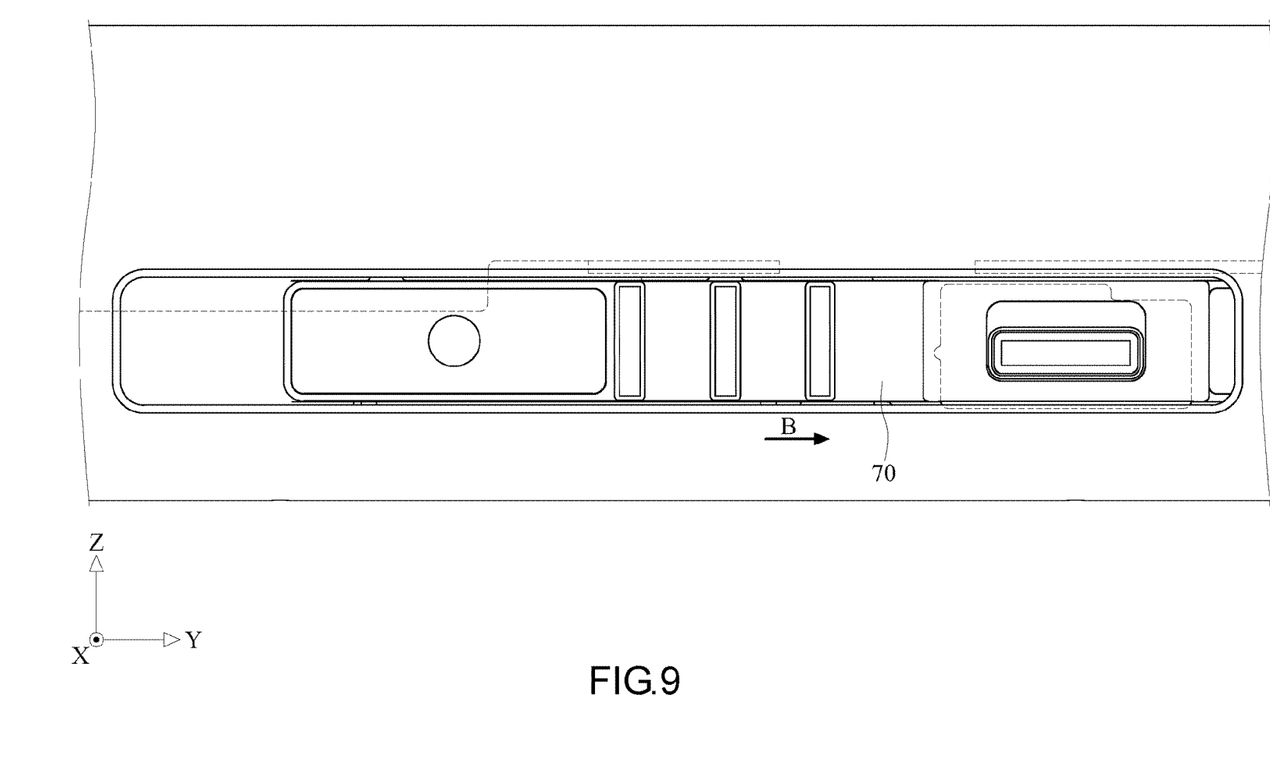
Figure 10:
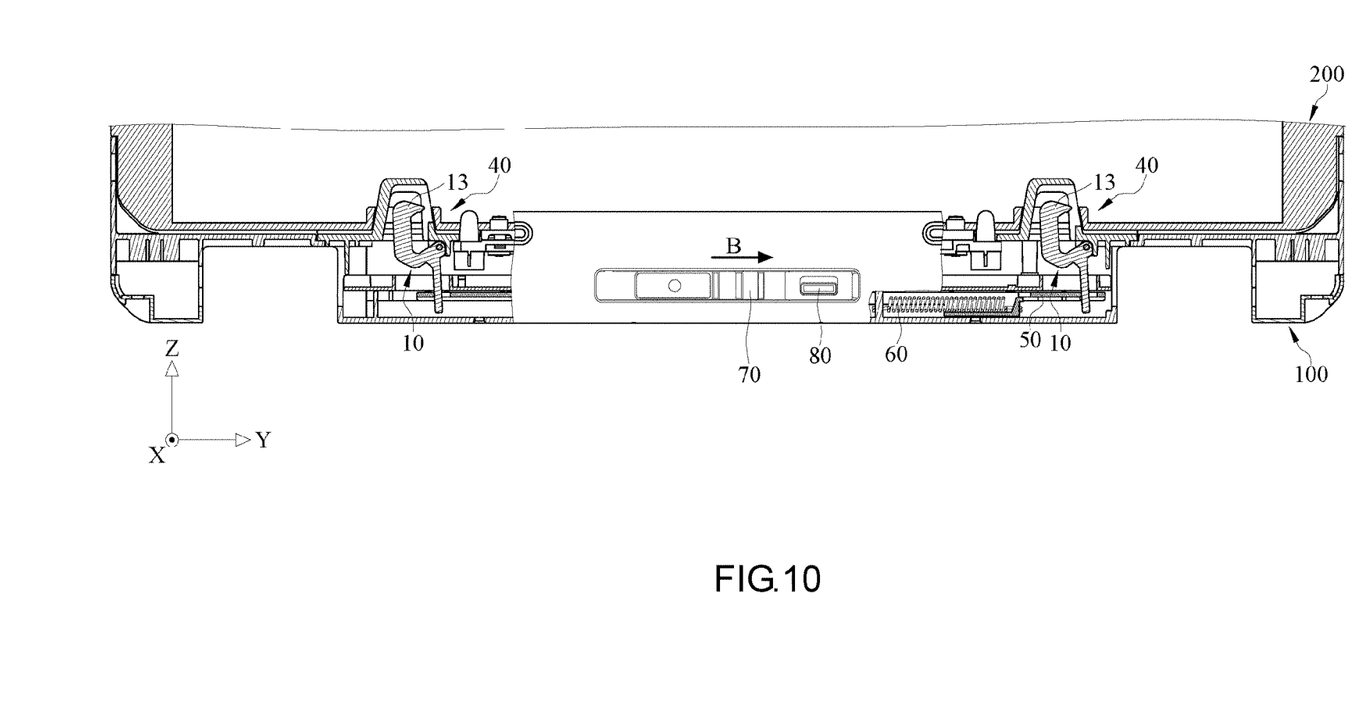

Referring to FIGS. 9-10, there are shown in FIG. 9 a schematic view of an unfastening position which an unfastening element shown in FIG. 5B switches to, and shown in FIG. 10 a schematic view of the unfastening position which the unfastening element shown in FIG. 5B switches to. To remove the first electronic device 200 from the transmission dock 100, the user slides the security knob 80 downward back to the hidden position (shown in FIG. 7) and then pushes the unfastening element 70 toward the unfastening position (in the direction indicated by arrow B) so that the linking element 50 drives to the rotary fastening element 10 to rotate counterclockwise (from the angle taken in FIG. 10), and in consequence the rotary fastening element 10 quits the engaging state, thereby terminating the engagement relationship between the hook portion 13 and the translating frames 40. At this point in time, the first electronic device 200 can be removed from the transmission dock 100.

The structure of the electronic apparatus 1000 as well as the assembly and disassembly processes performed with the engaging mechanism 1 are described above, but the present invention is not limited thereto. For instance, although the translating frames 40 of the engaging mechanism 1 each comprise the two inner sidewalls 420, 430 and the two upper wall surfaces 430, 440, the present invention is not restrictive of the quantity of the aforesaid components. For instance, in a variant embodiment, the translating frames 40 each comprise an inner sidewall and an upper wall surface which adjoins the inner sidewall.

Although the rotary fastening elements 10, the guiding frames 30 and the translating frames 40 of the engaging mechanism 1 are each in the number of two, the present invention is not restrictive of their quantity. For instance, in a variant embodiment, the engaging mechanism comprises one said rotary fastening element 10, one said guiding frame 30 and one said translating frame 40 and is still able to prevent the first electronic device 200 from moving away from the transmission dock 100 and separating from the transmission dock 100.

Although the engaging mechanism 1 comprises the linking element 50 and the elastic element 60, both the linking element 50 and the elastic element 60 are optional. For instance, in a variant embodiment, the engaging mechanism dispenses with the elastic element 60 but has a torsional spring disposed on each of the two rotary fastening elements 10, thereby being still able to cause the rotary fastening elements 10 to normally reach the engaging state. It is to be understood that, in this embodiment, the engaging mechanism can also dispense with the linking element 50, because both the two rotary fastening elements 10 can reach the engaging state.

The unfastening element 70 and the security knob 80 are optional. For instance, in a variant embodiment, the engaging mechanism dispenses with the unfastening element 70 and the security knob 80, as the user performs an unfastening process by moving manually the two rotary fastening elements 10 and thereby allowing them to quit the engaging state, simultaneously.

Regarding the engaging mechanism, the transmission dock equipped with the same, and the electronic apparatus having the same, the user finishes performing the assembly process by moving the first electronic device (i.e., a monitor) in the support direction substantially perpendicular to the support surface so as for the first electronic device to connect with the transmission dock, because the rotary fastening elements rotate about the axis substantially parallel to the support surface of the transmission dock, not to mention that in the aforesaid course the translating frames smoothly push and slide past the rotary fastening elements so as to effectuate engagement. Hence, the engaging mechanism of the present invention is operated intuitively and conveniently and thus enables the user to mount the first electronic device (i.e., a monitor) on the second electronic device (i.e., a keyboard) quickly.

The rotary fastening elements are stopped on the upper wall surfaces of the translating frames as soon as the rotary fastening elements rotate and reach the engaging state;

hence, the translating frames are restricted by the rotary fastening elements and thus stay on the support surface. Therefore, the first electronic device stays on the support surface to reinforce the connection of the first electronic device and the second electronic device and prevent the first electronic device from moving away from the transmission dock and separating from the transmission dock, thereby precluding termination of the engagement relationship between the first electronic device and the second electronic device because of a vibration or impact.

According to the present invention, the engaging mechanism, the transmission dock equipped with the same, and the electronic apparatus having the same are advantageously conducive to quick assembly of a two-piece computer and firm connection of a tablet and the transmission dock, easy to use, and conducive to a slim chance that the connection will be undermined because of impacts and vibrations.

Although the present invention is disclosed above by preferred embodiments, the preferred embodiments are not restrictive of the present invention. Changes and modifications made by persons skilled in the art to the preferred embodiments without departing from the spirit and scope of the present invention must be deemed falling within the scope of the present invention. Accordingly, the legal protection for the present invention should be defined by the appended claims.

What is claimed is:

1. An engaging mechanism, comprising:
   at least one rotary fastening element biased to rotate about an axis to an engaging state;
   at least one guiding frame having two opposing outer sidewalls and being protrudingly disposed on a support surface of a transmission dock, wherein the axis is substantially parallel to the support surface, and the at least one rotary fastening element protrudes from one of the two outer sidewalls in the engaging state; and
   at least one translating frame having two opposing inner sidewalls and two upper wall surfaces adjoining the two inner sidewalls, respectively, arranged such that when the guiding frame is partially received in the translating frame, the two outer sidewalls are disposed between and respectively face the two inner sidewalls, and the at least one rotary fastening element contacts and is driven by one of the two inner sidewalls to quit the engaging state, and when the at least one guiding frame is fully received in the translating frame and the translating frame contacts with the support surface, the at least one rotary fastening element is released from the one of the two inner sidewalls and rotates to the engaging state so as to engage with one of the two upper wall surfaces.

2. The engaging mechanism of claim 1, wherein the at least one rotary fastening element comprises a pivotal portion, an arm and a hook portion, the pivotal portion being positioned proximate to a side of the at least one guiding frame through the axis, allowing the arm and the hook portion to extend from the pivotal portion successively, wherein when the at least one guiding frame is fully received in the translating frame and the translating frame contacts with the support surface and the at least one rotary fastening element rotates to the engaging state, the hook portion protrudes from one of the two outer sidewalls and is stopped at one of the two upper wall surfaces.

3. The engaging mechanism of claim 2, wherein when the guiding frame is partially received in the translating frame, one of the two inner sidewalls pushes a pushed area of the hook portion to drive the at least one rotary fastening element to rotate and quit the engaging state while the at least one translating frame is moving in a support direction substantially perpendicular to the support surface so as to contact the support surface.

4. The engaging mechanism of claim 2, wherein a reference line parallel to the support direction crosses the hook portion, one of the two upper wall surfaces and the pivotal portion when the at least one translating frame contacts the support surface and the at least one rotary fastening element is in the engaging state.

5. The engaging mechanism of claim 1, further comprising a linking element and an elastic element, with the at least one rotary fastening element being in a number of two, wherein the linking element connects with the two rotary fastening elements, and the elastic element connects with the linking element so as to bias the two rotary fastening elements to rotate to the engaging state.

6. A transmission dock, adapted to connect with a first electronic device, allowing a connecting lateral side of the first electronic device to align with a support direction and connect with the transmission dock through at least one translating frame, the transmission dock comprising:
   a base having a receiving slot for receiving the connecting lateral side;
   at least one rotary fastening element biased to rotate about an axis to an engaging state; and
   at least one guiding frame having two opposing outer sidewalls and protrudingly disposed on a support surface of a bottom of the receiving slot, wherein the axis is substantially parallel to the support surface,
   wherein the at least one translating frame has two opposing inner sidewalls and two upper wall surfaces adjoining the two inner sidewalls, respectively, arranged such that when the guiding frame is partially received in the translating frame, the two outer sidewalls are disposed between and respectively face the two inner sidewalls, and the at least one rotary fastening element contacts and is driven by one of the two inner sidewalls to quit the engaging state, and when the at least one guiding frame is fully received in the translating frame and the translating frame contacts with the support surface, the at least one rotary fastening element is released from the one of the two inner sidewalls and rotates to the engaging state so as to engage with one of the two upper wall surfaces.

7. The transmission dock of claim 6, wherein the at least one rotary fastening element comprises a pivotal portion, an arm and a hook portion, the pivotal portion being positioned proximate to a side of the at least one guiding frame through the axis, allowing the arm and the hook portion to extend from the pivotal portion successively, wherein when the at least one guiding frame is fully received in the translating frame and the translating frame contacts with the support surface and the at least one rotary fastening element rotates to the engaging state, the hook portion protrudes from one of the two outer sidewalls and is stopped at one of the two upper wall surfaces to allow the first electronic device to be fixed to the transmission dock.

8. The transmission dock of claim 7, wherein when the guiding frame is partially received in the translating frame, one of the two inner sidewalls pushes a pushed area of the hook portion to drive the at least one rotary fastening element to rotate and quit the engaging state while the at least one translating frame is moving in a support direction substantially perpendicular to the support surface so as to contact the support surface.

9. The transmission dock of claim 7, wherein a reference line parallel to the support direction crosses the hook portion, one of the two upper wall surfaces and the pivotal portion when the at least one translating frame contacts the support surface and the at least one rotary fastening element is in the engaging state.

10. An electronic apparatus, comprising:
a transmission dock;
a first electronic device having a connecting lateral side and at least one translating frame, with the at least one translating frame disposed on the connecting lateral side, allowing the first electronic device to be aligned with a support direction and electrically connected to the transmission dock;
a second electronic device for holding the transmission dock, wherein the transmission dock comprises:
a base having a receiving slot for receiving the connecting lateral side;
at least one rotary fastening element biased to rotate about an axis to an engaging state; and
at least one guiding frame having two opposing outer sidewalls and protrudingly disposed on a support surface of a bottom of the receiving slot, wherein the axis is substantially parallel to the support surface,
wherein the at least one translating frame has two opposing inner sidewalls and two upper wall surfaces adjoining the two inner sidewalls, respectively, arranged such that when the guiding frame is partially received in the translating frame, the two outer sidewalls are disposed between and respectively face the two inner sidewalls, and the at least one rotary fastening element contacts and is driven by one of the two inner sidewalls to quit the engaging state, and when the at least one guiding frame is fully received in the translating frame and the translating frame contacts with the support surface, the at least one rotary fastening element is released from the one of the two inner sidewalls and rotates to the engaging state so as to engage with one of the two upper wall surfaces.

11. The electronic apparatus of claim 10, wherein the at least one rotary fastening element comprises a pivotal portion, an arm and a hook portion, the pivotal portion being positioned proximate to a side of the at least one guiding frame through the axis, allowing the arm and the hook portion to extend from the pivotal portion successively, wherein when the at least one guiding frame is fully received in the translating frame and the translating frame contacts with the support surface and the at least one rotary fastening element rotates to the engaging state, the hook portion protrudes from one of the two outer sidewalls and is stopped at one of the two upper wall surfaces.

12. The electronic apparatus of claim 11, wherein when the guiding frame is partially received in the translating frame, one of the two inner sidewalls pushes a pushed area of the hook portion drive the at least one rotary fastening element to rotate and quit the engaging state while the at least one translating frame is moving in the support direction substantially perpendicular to the support surface so as to contact the support surface.

13. The electronic apparatus of claim 11, wherein a reference line parallel to the support direction crosses the hook portion, one of the two upper wall surfaces and the pivotal portion when the at least one translating frame contacts the support surface and the at least one rotary fastening element is in the engaging state.

* * * * *